June 17, 1924.

J. H. OSBORNE

MEAT SLICER AND STACKER

Filed June 1, 1923

INVENTOR

John H. Osborne,

BY

Arthur M. Hood

ATTORNEY

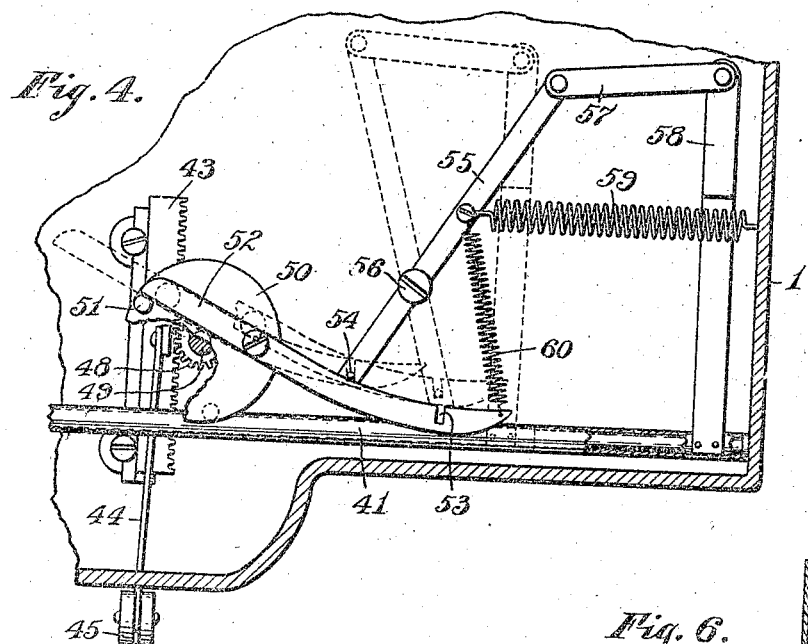
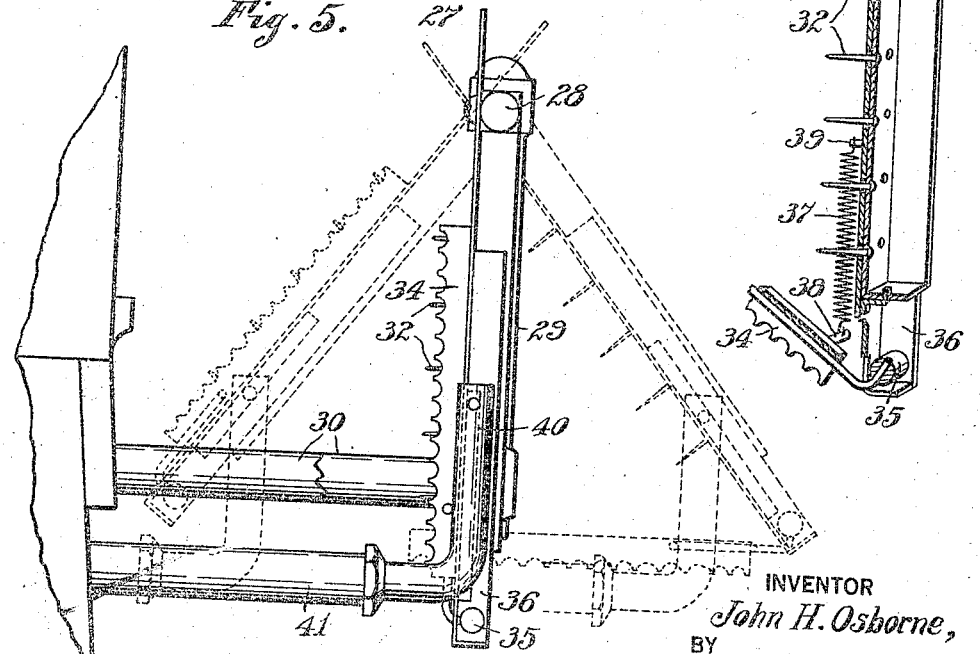

Patented June 17, 1924.

1,498,114

UNITED STATES PATENT OFFICE.

JOHN H. OSBORNE, OF ANDERSON, INDIANA.

MEAT SLICER AND STACKER.

Application filed June 1, 1923. Serial No. 642,817.

*To all whom it may concern:*

Be it known that I, JOHN H. OSBORNE, a citizen of the United States, residing at Anderson, in the county of Madison and State of Indiana, have invented a new and useful Meat Slicer and Stacker, of which the following is a specification.

My invention relates to improvements in meat slicing machines and it is one of the objects of my invention to provide an improved form of stacking mechanism for receiving the slice as it is cut from the stock by the knife and depositing the same, one on top of the other, in orderly pile.

For the purpose of disclosing my invention, I have illustrated one embodiment thereof in the accompanying drawing in which—

Fig. 4 is a bottom plan showing the stacking operating mechanism;

Fig. 5 is an enlarged side elevation of the stacker, and

Fig. 6 is a detail section of the stacker.

Figure 1:
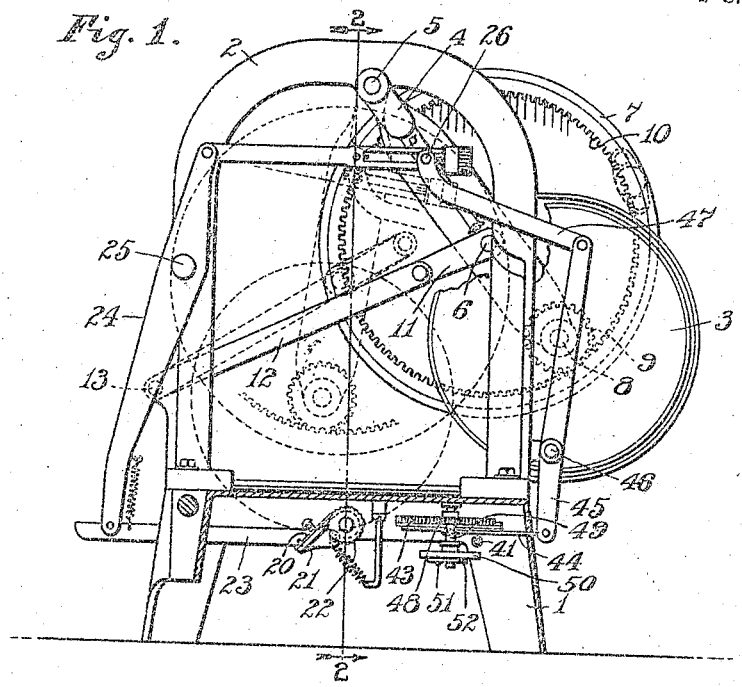
Fig. 1 is a sectional view taken on the line 1—1 of Fig. 2.
Figures 2, 3:
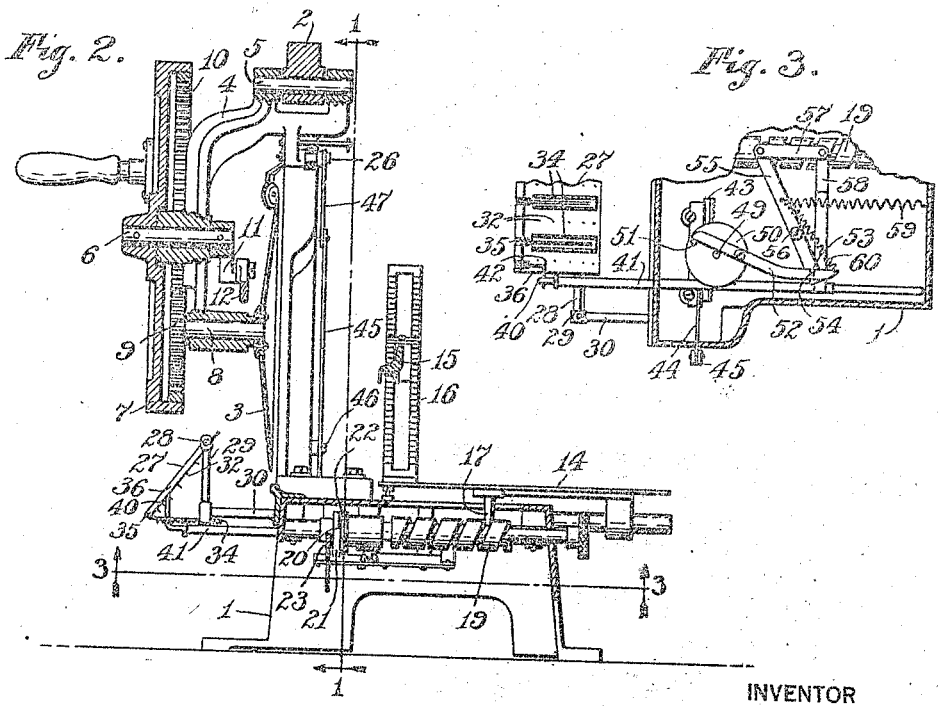
Fig. 2 is a sectional view on the line 2—2 of Fig. 1.
Fig. 3 is a detail section on the line 3—3 of Fig. 2.

In the embodiment illustrated, the slicing machine is provided with a base 1 having extended upwardly therefrom at the forward end, a U shaped frame 2 on which the slicing knife 3 is mounted for operation. This knife is of the usual rotary type and is moved relatively to the meat to be cut. To this end I provide a swinging arm 4 which is pivoted at 5 to the top of the frame 2 and intermediate of its ends is provided with a bearing supporting a shaft 6 on which is mounted the drive wheel 7 for the knife. The knife is mounted upon a shaft 8 journaled at the lower end of the arm 4 and provided with a pinion 9 meshing with an internal gear 10 on the wheel 7 so that the rotation of the wheel will likewise rotate the knife. The arm 4 is swung on its pivot 5 to swing the knife across the face of the meat to be cut, by means of a crank 11 on the inner end of the shaft 6 and rotated thereby and having its outer end connected to a pitman rod 12, the opposite end of which is pivoted at 13 to one leg of the frame 2. By this arrangement, as the wheel 7 is rotated to rotate the knife, the knife is swung back and forth across the face of the meat to be cut.

The meat to be sliced is mounted upon a traveling table 14 mounted above the base 1 and provided with a clamp 15 adjustably secured in a frame 16 for holding the meat securely in position with its end projecting beyond the end of the table. The table on its under side, is provided with a downwardly extending dog 17 arranged to engage in a screw 19 mounted beneath the top of the base and by which the table may be advanced step by step toward the knife. For rotating the screw 19 I provide a pawl 20 mounted on an arm 21 oscillatingly supported on a center coincident with the center of the screw 19 and this pawl 20 is adapted to co-operate with a ratchet wheel 22 mounted on the screw 19. The lever 21 is connected by means of a link 23 with the lower end of an operating lever 24 pivoted at 25 to the frame 2 and connected at its upper end by a lost motion connection with a stud 26 on a portion of the arm 4. It is thus seen that as the wheel 4 is rotated the knife is rotated and likewise oscillated across the face of the base and at the same time the supporting table is moved forward step by step.

As the slice is cut, it drops off onto the stacker by which it is laid horizontally in a stack at the point of deposit. The stacker comprises a receiving plate 27 which is oscillatingly hung from a cross bar 28 pivoted at the upper ends of a pair of uprights 29 longitudinally adjustably mounted on projecting arms 30 extending forwardly from the base. The plate 27 is provided on its face with pins 32 which act as retaining means to catch the meat slice as it drops off the main body onto the plate. The retaining pins 32 support the slice on the plate in front of a series of flies 34 arranged, when the plate is in receiving position, to lie parallel with the plate and mounted at their lower ends upon a rocker arm 35 pivoted between the two end flanges 36 of the plate. These flies are maintained in their normal position, that is, in substantial parallelism with the plate 27 by means of a coil spring 37, one end of which is attached to a lug 38 on one of the flies and the other end of which is attached to a stud 39 on the face of the plate. As the lower end of the plate is oscillated away from the delivery end of the meat table, the rocker arm is rotated to cause the flies to oscillate away from the plate and toward the horizontal to thereby pick up the slice deposited on the plate and deposit the same in a horizontal position at the point of deposit. The lower end of the plate is connected to the upturned end 40 of a reciprocating rod 41, which rod in its reciprocation, swings the plate back and forth on its rod 28 as illustrated in Fig. 5 and as the plate is swung away from the supporting table, a crank arm 42 is engaged by the extension 40 and rocked downwardly, thereby rocking with it the rod or shaft on which the flies 34 are mounted.

For reciprocating the rod 41 I provide an operating mechanism located on the under side of the base and operated from the swinging arm 4 by which the knife is operated. To this end, on the under side of the base, I provide a reciprocating rack 43 which is connected by a link 44 with the lower end of a lever 45 pivoted at 46 to the frame 2. The upper end of this lever 45 is connected by a link 47 with the stud 26 on the oscillating arm 4 so that as the arm is swung back and forth a corresponding movement will be imparted to the lever 45 which in turn will impart a reciprocating movement to the rack 43. Meshing with the rack 43 on the under side of the base 1 is a pinion 48 mounted on a shaft 49, which shaft also carries an oscillating wheel 50 provided on its face with a pin 51. Pivotally mounted on the wheel 50 is an arm 52 having a trigger notch 53 at its forward end adapted to receive a trigger pin 54 on the end of a lever 55 pivoted at 56 to the under side of the base. The opposite end of this lever is connected by a link 57 with a transversely extending arm 58 on the rod 41 so that as the lever 55 is oscillated on its pivot, it will move the rod 41 forward and back, the forward movement being imparted by the mechanism above described and the rearward movement being imparted by means of the spring 59.

By the above arrangement, as the knife is swung forward in a cutting direction, the lever 45 is moved to retract the rack 43 outwardly, thereby rotating the disk 50 in a counter-clockwise direction, when viewing the same as illustrated in Fig. 4, which removes the pin 51 from behind the rear end of the arm 52, which permits the forward end of the arm, under the influence of the spring 60 to move the notch in a position to receive the pin 54, whereby the arm 52 and the end of the lever 55 are connected so that the continued rotation of the disk 50, which tends to move the pivot point of the arm 52 rearwardly, will retract the arm 52 and with it the end of the lever 55, thereby projecting the arm 41 forwardly. The movement projecting the arm forwardly does not commence until after the knife has completed its cut and the slice deposited on the stacker plate. The forward projection of the arm as heretofore described, rocks the stacker plate so that by the time the arm has reached the outermost limit of its movement, the flies will have assumed a substantially horizontal position to deposit the slice on the stack.

The return movement of the knife toward its initial cutting position will cause the lever 45 to rock in the opposite direction, thereby projecting the rack 43 inwardly and rotating the wheel, or disk, 50, in a clockwise direction which will move the pin 51 into engagement with rear end of the arm 52, kicking the front end away from the lever 55 and disengaging the pin 54 from the notch 53, thereby permitting the rod 41 to be retracted to again position the stacker plate to receive the next succeeding slice.

I claim as my invention:

1. In a meat slicer, the combination with a table for holding the article to be sliced and knife movable relatively to one another transversely, of a stacker arranged to receive the slice as it falls from the piece and deposit it in a horizontal position, said stacker being transversely relatively stationary with respect to the table.

2. In a meat slicer, the combination with a table and a knife relatively transversely movable to one another to cause the knife to cut a slice vertically, of a stacker transversely stationary with respect to the table and arranged to receive the slice as it is cut by the knife and to move the same to a substantially horizontal position and deposit it in said horizontal position.

3. In a meat slicer, the combination with a table and knife movable transversely relatively to one another, of a stacker arranged transversely stationarily with respect to the table and including receiving flies, means for moving the lower ends of said flies toward the table into receiving position and moving the lower ends of the flies away from the table and the upper ends of the flies toward the horizontal to a depositing position.

4. In a meat slicer, the combination with a table and knife movable relatively transversely to one another, a stacker including a table oscillatingly mounted and normally supported with its front end in proximity to the table, means for swinging said stacker away from the table and toward a horizontal position face downwardly to permit the slice received thereby to drop off into a horizontal position.

5. In a meat slicer, the combination with a table and a knife transversely relatively movable, of a stacker transversely stationary with respect to the table and including a receiving plate, normally supported in a position inclining toward the horizontal, face upwardly and means for rotating said plate toward the horizontal, face downwardly, to permit the slice deposited thereon to drop off in a horizontal position.

6. In a meat slicer, the combination with a table and knife transversely relatively movable, of a stacker transversely stationary with respect to said table and including stacking flies normally arranged substantially horizontal with their front ends in proximity to the table, means for swinging their front ends away from the table and oscillating the flies toward the horizontal to deposit the slice in a horizontal position.

7. In a meat slicer, the combination with a table and knife relatively transversely movable, of a stacker relatively stationary with respect to the table and arranged to receive the slice in a substantially vertical position, means for rotating said stacker toward the horizontal position, face downwardly, to deposit the slice in a horizontal position.

8. In a meat slicer, the combination with a table and a knife transversely relatively movable, of a stacker for receiving the slices as they fall from the table in a substantially vertical position and depositing the same in a substantially horizontal position, including a receiving plate hingedly secured at its upper end with its lower end free and normally inclined toward the table, means for swinging the lower end of the plate away from the table and flies pivoted at the lower end of the table and arranged, when the plate is swung away from the table, to have their free ends moved away from the plate.

9. In a meat slicer, the combination with a table and a knife transversely relatively movable, of a stacker hingedly and transversely stationarily supported in front of said plate with one end normally in proximity to the table, means for swinging said plate away from the table and toward the horizontal, face downwardly, and means for removing the slice from said plate as it is being swung.

10. In a meat slicer, the combination with a table and a knife movable relatively to one another, of a stacker arranged to receive the slice as it falls from the piece and deposit it in a horizontal position, said stacker being transversely relatively stationary with respect to the table and means operated by the means for producing the relative movement between the knife and table for operating said stacker.

11. In a meat slicer, the combination with a table and knife movable transversely relatively to one another, of a stacker arranged transversely stationary with respect to the table and including a stacker plate hingedly mounted at its upper point at a point above and in front of the table and means operated by the knife-operating mechanism for swinging the lower end of said plate toward and away from the table.

12. In a meat slicer, the combination with a table and knife relatively transversely movable, of a stacker for receiving the slices as they fall from the table including a stacker plate hingedly mounted at one end and having its opposite end free and means for swinging said free end toward and away from the table, including an oscillating crank, an arm mounted on said crank, a reciprocating member arranged to be connected with the stacker and means for connecting said member with said arm when it is moved in one direction and disconnecting the same when said arm reaches the limit of its movement in said direction.

In witness whereof, I, JOHN H. OSBORNE, have hereunto set my hand at Indianapolis, Indiana, this 23rd day of May, A. D. one thousand nine hundred and twenty-three.

JOHN H. OSBORNE.